J. R. MEYERS.
CHEESE MOLD.
APPLICATION FILED NOV. 18, 1920.
1,434,396.
Patented Nov. 7, 1922.
2 SHEETS—SHEET 1.
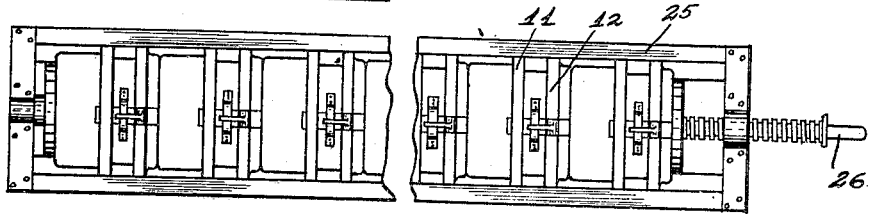
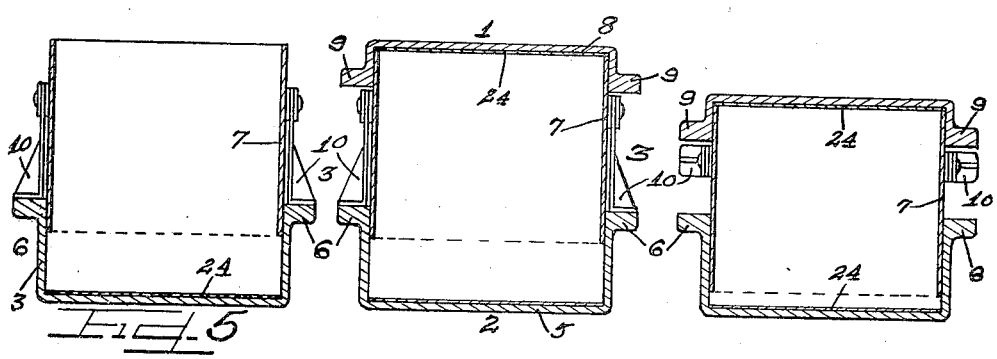
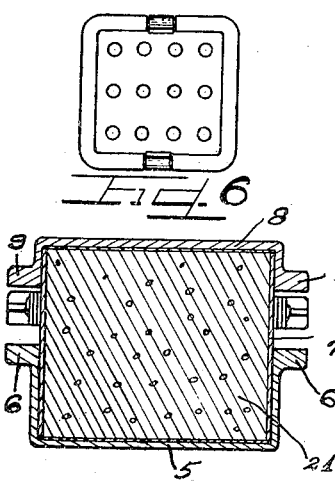
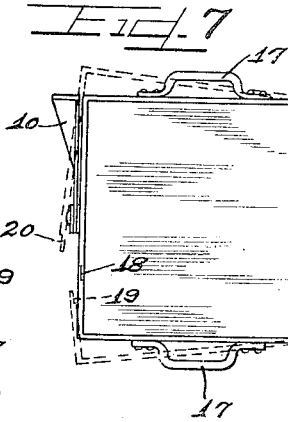
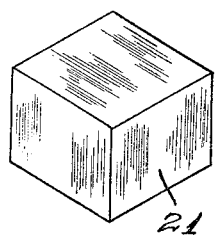
Witnesses
Rudolph J. Berg.
Charles W. Hill Jr.
Inventor
Julius R. Meyers.
By Charles W. Hill
Atty.

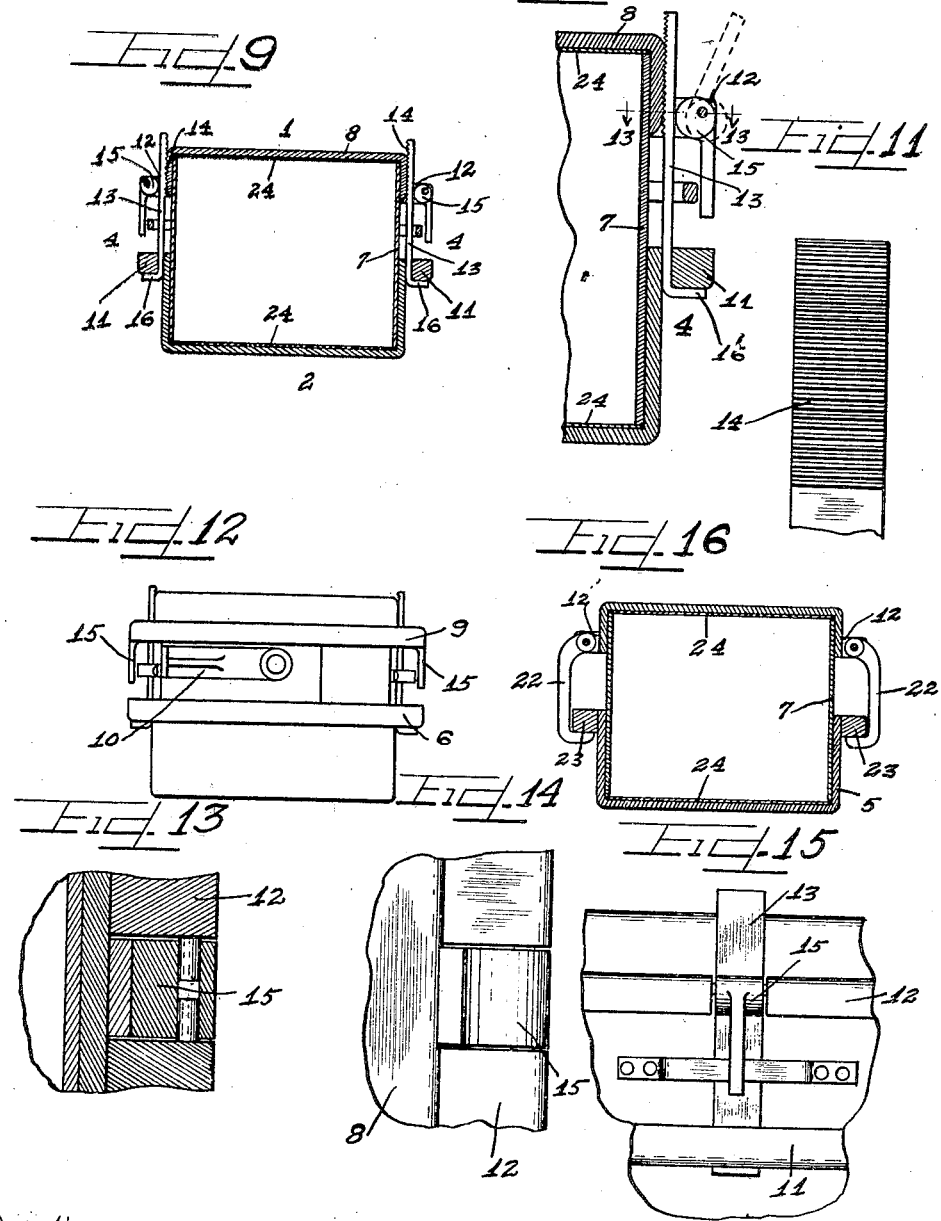

Patented Nov. 7, 1922.

1,434,396

UNITED STATES PATENT OFFICE.

JULIUS R. MEYERS, OF GLENCOE, ILLINOIS.

CHEESE MOLD.

Application filed November 18, 1920. Serial No. 424,828.

*To all whom it may concern:*

Be it known that I, JULIUS R. MEYERS, a citizen of the United States, and a resident of the city of Glencoe, in the county of Cook and State of Illinois, have invented certain new and useful Improvements in a Cheese Mold; and I do hereby declare that the following is a full, clear, and exact description of the same, reference being had to the accompanying drawings, and to the numerals of reference marked thereon, which form a part of this specification.

My invention relates more particularly to a cheese making mold. In the manufacture of cheese in the past, the curd was put in the molds, and a number of these molds would be put in a press and compressed to squeeze out the whey, the molds being left in the press for about 12 hours. A great many presses were hence required and a large factory was necessary. My invention, among other things, is designed to overcome these objections.

It is therefore an object of this invention to provide a compressible mold that can be locked to hold the cheese in proper compression when removed from the press.

It is also an object of this invention to provide an expansible mold that will allow the compressed cheese to be readily removed therefrom.

It is also an object of my invention to provide a mold adjustable for holding a predetermined quantity of curd.

Other and further important objects of this invention will be apparent from the disclosures in the specification and drawings.

My invention is disclosed in the accompanying drawings and hereinafter more fully described and defined in the appended claims.

In the drawings:

Figure 1 is a top plan view of a press with a plurality of the molds involving my invention therein.

Figure 2 is a section through a mold showing the means I employ for expanding the mold to a predetermined point with the cover removed.

Figure 3 is a section similar to Figure 2 with the cover on the mold.

Figure 4 is a section showing the mold in compressed form.

Figure 5 is a plan view of the mold showing the perforations on a small scale.

Figure 6 is a section through a mold showing the cheese in compressed form.

Figure 7 is a top plan view of an expansible sleeve used in my mold.

Figure 8 represents a block of compressed cheese on a small scale.

Figure 9 is a section through my improved mold showing a form of locking means that is preferably employed.

Figure 10 is a fragmentary section upon an enlarged scale showing the locking mechanism.

Figure 11 shows the serrated surface on the cover forming a part of my mold locking means.

Figure 12 is an elevational end view of my improved mold.

Figure 13 is a section on the line 13—13 of Figure 10.

Figure 14 is a fragmentary top plan view of the locking mechanism.

Figure 15 is a fragmentary top and bottom plan view of my mold showing the construction.

Figure 16 is a section through my mold showing a modified form of locking mechanism.

As shown in the drawings:

In the different figures of the drawing, similar features are denoted by similar reference numerals.

In the drawings, I have illustrated my mold and for the purposes of description I will designate the faces 1 and 2 (see Fig. 3) as the sides of the mold, the faces 3 as the ends of the mold, and the faces 4 (see Fig. 9) as the top and bottom of the mold.

As will be observed my mold consists of a section 5 having the side 2 perforated as shown in Fig. 5 and having a projecting flange 6 upon each end. A hoop or sleeve member 7 telescopes in the section 5 and is closed by a perforated and flanged cover 8 having the end flanges 9. Approximately at the center of each end of the sleeve 7, there is pivoted a stop foot 10, which can be swung into engagement with the flange 6 to limit the inward telescoping of the sleeve 7 and be swung out of engagement therewith, as shown in Figure 12, to allow the sleeve 7 to enter the section 5 as far as possible, as shown in Figure 10. The length of the telescoping adjustment allowed by the stop feet 10 should be sufficient to allow such compression of the cheese as is necessary to squeeze out the whey and properly compress the cheese. This can readily be determined, if necessary, by measuring the average compression per unit of measurement, as is well known to most dairymen.

As best shown in Figure 9, the top and bottom of the section 5 and cover 8 are also preferably provided with the flanges 11 and 12, through which the serrated rack bars 13 extend, proper slots being provided in the flanges for this purpose, and the top and bottom of the flanged cover 8 is provided with the roughened or serrated surfaces 14 with which the serrated racks coact to hold the mold in locked position. A cam device 15 is rotatably supported in each flange 12 directly opposite a rack 13 and is adjustable to firmly lock or release each rack in its adjusted position. Each rack is preferably provided with a foot 16 adapted to underlie the flange 11 to prevent it from sliding through said flange.

At the top and bottom, the sleeve 7 is provided with a handle 17 plainly shown in Figure 7, which illustrates the method of expanding the sleeve 7 when removed from the mold so that the cheese can be readily removed therefrom. It will be noted that one end or face of the sleeve 7 is provided with a separable overlapping joint 18 formed by cutting a groove 19 in the inner fringe of one part and a groove 20 in the outer fringe of the other part. It is contemplated that the sleeve 7 be made of sufficiently resilient material to allow a spring action. It will therefore only be necessary to grasp the handles 7 and pull in opposite direction to expand the sleeve, as shown in Fig. 7, to allow the cheese 21 to fall or be removed therefrom.

In Fig. 10 I have illustrated a mold-locking means that is adjustable and capable of holding the cheese at the same degree of compression as when the mold was in the press. But in cases where such refinement is not desired, such locking means as shown in Fig. 16 may be utilized, wherein a hook member 22 is pivoted in each flange 12 and is adapted to be hooked over a flange 23 welded or otherwise secured to the mold section 5.

The operation is as follows:

In the use of molds embodying my invention, it is contemplated that the stop feet 10 should be placed in engagement with the flanges 6 before the curd is placed therein, as shown in Fig. 3, thereby adjusting the mold for holding a predetermined quantity of curd which can be properly compressed when the feet 10 are moved from engagement with the flanges 6. Before the curd is put into a mold, the section 5 and cover 8 may be provided with proper sheets of cheese cloth 24. As many molds as can be put into a press may then be filled, and the covers 8 placed upon the sleeves 7. The feet 10 may then be removed from engagement with the flanges 6 and the cams 15 placed in released position; the molds can then be packed in the press 25 and compressed by the screw 26 as is obvious and well known in the art. The compression will cause the sleeve member 7 to telescope into the section 5, the whey being squeezed out through the perforated sides, and when the curd has been properly compressed, the molds may be locked as before explained and removed from the press and allowed to stand in proper temperature for 12 hours or so, during which time the cheese will expand in the sleeve. But the press can be utilized in the meantime for compressing a second tier of molds thereby avoiding loss of time. When the compressed and locked molds have stood for a sufficient period to complete the necessary action to produce the green cheese, the locking means can be released and the sleeves 7 can be removed from the sections 5, and the covers 8 also removed, the sleeves 7 can then be expanded as previously explained to allow the cheese to fall or be removed therefrom.

I desire it to be understood that it has been found very practicable in some instances to press the small cheeses in their molds individually instead of in groups, as is illustrated in Figure 1, and when this is done, I use a hydraulic press or any other suitable device adapted to press each cheese separately so that the mold may be locked as has been described. When this is done, it has been found that the process of pressing and locking each cheese is greatly facilitated and the process is speeded up considerably, as will be obvious to one skilled in the art.

It will accordingly be observed that I have devised a mold that can be locked to hold the cheese in compressed position so that the same can be removed from the press as soon as the compression is complete, and that embodies an expansible cheese-holding sleeve for the purpose set forth.

I am aware that numerous details of construction may be varied through a wide range without departing from the principles of this invention, and I therefore do not purpose limiting the patent granted otherwise than necessitated by the prior art.

I claim as my invention:

1. A cheese mold comprising a mold section, a sleeve adjustable in said section, a cover for said sleeve, and releasable devices cooperating with said cover and section for locking the parts together.

2. A cheese mold comprising a pair of telescopic members, a swingable foot upon one of said members, and a projecting flange on the other member adapted to receive said foot for holding said members for receiving a predetermined quantity of curd.

3. A cheese press comprising a pair of relatively movable sections for confining the cheese therebetween, means for limiting the movement of the sections in one direction for containing a predetermined amount of curd, and means for locking said sections after pressing thereof.

4. In a cheese press, a pair of relatively movable sections for confining the cheese therebetween, a device for limiting the movement of said sections to predetermined capacity, said device being releasable for allowing said sections to be pressed together, and a locking means engaging both sections for holding said sections in their pressed relation.

5. In a cheese mold, a pair of telescoping sections, means for adjusting the same for containing a predetermined amount of curd, a locking device anchored to one section and engaging the other section, and means for locking said device to said other section in any adjusted position of said sections.

6. In a cheese mold, a pair of telescoping sections, a locking rod anchored to one section and having a serrated surface engaging serrations on the other section, and a rotatable cam device engaging said rod for adjustably locking the same to said other section.

In testimony whereof I have hereunto subscribed my name in the presence of two subscribing witnesses.

JULIUS R. MEYERS.

Witnesses:
 CHARLES W. HILLS, Jr.,
 EARL M. HARDINE.